W. LE R. DIXON & F. E. SHANLEY.
PROTECTOR FOR TAXICAB METERS.
APPLICATION FILED FEB. 7, 1914.
1,112,273.
Patented Sept. 29, 1914.
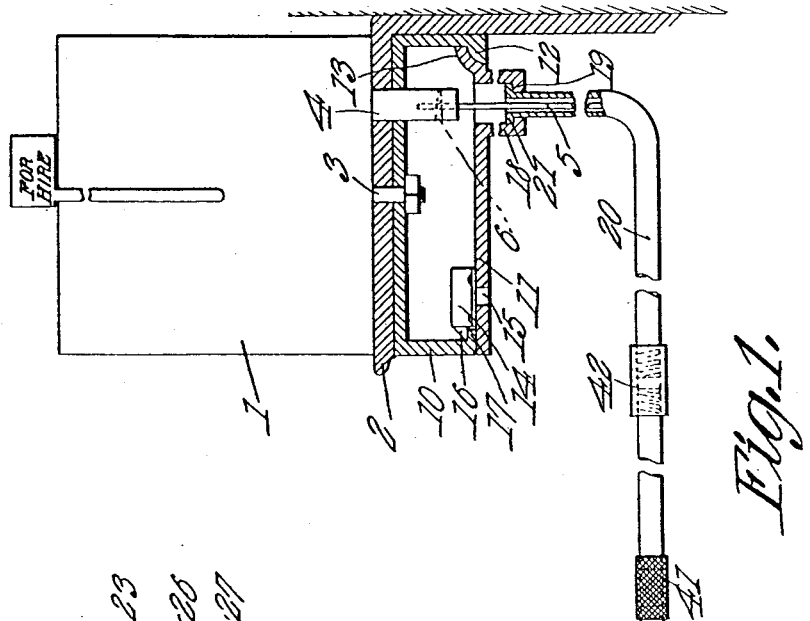
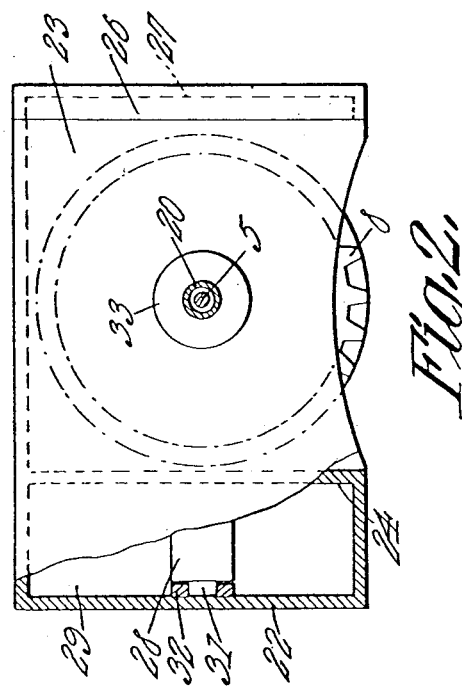
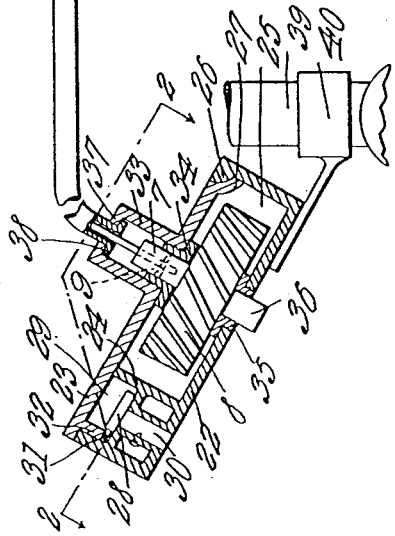
W. L. Dixon and
F. E. Shanley, Inventors

UNITED STATES PATENT OFFICE.

WALTER LE ROY DIXON AND FRANCIS E. SHANLEY, OF PITTSBURGH, PENNSYLVANIA.

PROTECTOR FOR TAXICAB-METERS.

1,112,273.   Specification of Letters Patent.   Patented Sept. 29, 1914.

Application filed February 7, 1914. Serial No. 817,377.

*To all whom it may concern:*

Be it known that we, WALTER L. DIXON and FRANCIS E. SHANLEY, citizens of the United States, residing at Pittsburgh, in the county of Allegheny, State of Pennsylvania, have invented a new and useful Protector for Taxicab-Meters, of which the following is a specification.

The present invention appertains to an appliance for protecting the actuating mechanism of a taxicab meter, whereby the same may not be tampered or interfered with, by the chauffeur or other unwarranted or malicious persons without so injuring the device, as to create suspicion or detection.

Another object of the present invention is to provide a protector of the nature indicated which will eliminate the use of the ordinary seals for protecting the meter and its actuating mechanism, it being in many cases possible for the chauffeur or others to break the seals for releasing the meter, and to later apply new seals to avoid detection.

As a more specific object, the present invention aims to provide unique cases for inclosing the ends of the flexible meter-actuating shaft, which are connected to the meter shaft and the actuating gear, in connection with a tubing or housing for the said flexible shaft, which has its ends connected to the said cases in a novel manner, the cases including removable covers or closures which are normally retained in place by suitable key-controlled locks.

It is also within the scope of the present invention to provide a contrivance of the nature indicated, for preventing tampering with the meter and its actuating mechanism, whereby the owner of the taxicab, or the chauffeur's employer, will not be liable to be defrauded, and which contrivance or device is comparatively simple, compact, and inexpensive in construction, as well as being convenient, serviceable, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed can be made without departing from the spirit of the invention.

The invention has been illustrated in its preferred embodiment in the accompanying drawing, wherein:—

Figure 1 is an elevation of the appliance as in use, parts being shown in section, and parts being broken away. Fig. 2 is an enlarged sectional view taken on the line 2—2 of Fig. 1.

In the drawing, there has been designated at 1, an ordinary taxi-cab meter, which is usually mounted upon an angular bracket 2, secured to the body of the taxi-cab or motor vehicle, the meter case having depending securing means 3 engaged through the shelf portion of the bracket 2, and the meter shaft 4 depending and being journaled through the shelf portion of the bracket 2; also. One end of the flexible actuating shaft 5 is secured within the lower end of the meter shaft 4 by means of a cotter pin or securing member 6, while the other or lower end of the flexible shaft 5, is secured within one trunnion 7 of the actuating gear 8, by means of a cotter pin or securing member 9. The gear 8 which has spiral threads upon its periphery, is arranged, as ordinarily, to be given an intermittent or step by step movement by means of a tappet (not shown) carried by one of the forward wheels of the motor vehicle.

The foregoing parts are common in taxicab meters and it is the primary object of the present invention to provide means for protecting the flexible shaft 5, and the connections or couplings between the flexible shaft and the meter shaft and actuating gear 8, whereby the meter cannot be disconnected by the chauffeur or driver.

In order to protect the upper end of the shaft 5, a case 10 having its bottom open, is secured to the bottom of the shelf portion of the bracket 2, by the securing means 3, the said securing means being inclosed by the case 10 to prevent the same from being released. The case 10 is provided with a removable bottom or closure 11, the rear end having an inturned rounded lip 12, and the rear end of the cover or closure 11 having a curved flange 13 adapted to engage over the lip 12 to lock the rear end of the cover 11 to the rear end of the base 10, and to permit the forward end of the cover to be swung to and from the forward end of the case in order to lock the cover 11 in place. A key-controlled lock 14 is secured upon the inner face of the cover 11 adjoining the forward end of the cover, the lock 14 including a key-barrel 15 engaging through the cover 11 and a spring pressed latch bolt 16 engageable over a keeper or lug 17 provided upon the inner face of the forward end of the case 10. Thus, when the flange 13 at the rear end of the cover 11 is engaged over the lip 12, and when the forward end of the cover is swung against the forward end of the case 10, the latch 16 is arranged to snap over the keeper lug 17 for locking the cover in place, and to prevent the case from being opened without the assistance of the proper key.

The meter shaft 4 terminates within the case 10 whereby the securing means 6 coupling the upper end of the flexible shaft 5 and the lower end of the meter shaft together, will be housed and protected.

The cover or bottom 11 of the case 10 is provided with a depending or outstanding tubular portion 18, which has an inturned lip or flange 19 at its free or lower end, the tubular portion 18 being disposed below and being co-axial with the meter shaft 4, and the flexible actuating shaft 5 extending through the said tubular portion.

The flexible shaft 5 extends through a tubing 20, the upper end of the tubing 20 being passed loosely through the restricted aperture formed by the flange or lip 19 of the tubular portion 18, and having an outstanding flange or lip 21, disposed within the tubular portion 18 and seating upon the flange or lip 19 whereby the upper end of the tubing 20 will be anchored to the bottom or cover of the case 10 in an effective manner.

It is to be noted, at this point, that the tubular portion 18 in fitting slidably upon the upper end of the tubing or sheathing 20, will permit the cover 11, to be readily opened and closed, the tubular portion 18 sliding upon the upper end portion of the tubing 20. The tubing 20 may also rotate or oscillate with respect to the cover 11 without interfering with the connection of the tubing with the said cover.

The present invention further includes a case 22 for protecting the actuating gear 8 and the connection or coupling between the lower end of the flexible shaft 5 and the said gear, the case 22 and associated parts generally resembling the case 10 and accompanying parts above described.

The case 22 is provided with the removable lid or cover 23, and is also provided with a partition 24, between its sides and adjoining one end, to provide an open sided compartment 25 between the said partition and the other end for normally housing the actuating gear 8.

That end of the case 22 adjoining the gear 8 is provided with a curved lip 26 at its free edge, and the corresponding end of the cover or lid 23 is provided with a curved flange 27 to engage or hook under the lip 26, similar to the lip 12 and flange 13 above described. Thus, one end of the cover 23 may be readily engaged to one end of the case 22 whereby the said cover may be closed against the case 22.

In order to lock the free end of the cover or lid 23 to the end of the case 22 opposite that end having the lip 26, the key-controlled lock 28 is disposed within the compartment 29 between the partition 24 and the adjoining end of the case, the lock 28 including a key-barrel 30 extending through the bottom of the case 22, and a spring pressed latch bolt 31 engageable with an apertured keeper 32 carried by the free end of the cover 23 and adapted to swing within the respective end of the case 22. Thus, when the lip and flange 26 and 27, respectively, are interengaged, and when the cover 23 is swung closed, the keeper 32 will be engaged by the latch bolt 31 to lock the cover in place, and prevent the case 22 from being opened, except by means of a proper key.

The cover or lid 23 is provided with an upstanding tubular portion 33 receiving the trunnion 7 of the gear 8, a bushing 34 being threaded or otherwise engaged within the basal portion of the tubular portion 33 for journaling the trunnion in place, and a similar bushing or bearing 35 is engaged through the bottom of the case 22 for journaling the other trunnion 36 of the gear, the inner or adjoining ends of the bushings or bearing 34 and 35 preferably being flanged to engage the faces or sides of the gear 8.

The tubular portion 33 is provided at its free or upper end with an inturned flange or lip 37, through which the lower end of the tubing 20 is passed loosely, the lower end of the said tubing being provided with an out turned flange or lip 38 fitting loosely within the tubular portion 33 and adapted to rest against the flange or lip 37, whereby the lower end of the tubing 20 will be effectively anchored to the cover 23 of the case 22. In this manner, the tubing 20 which sheaths or houses the flexible shaft 5, has its terminals loosely anchored to the cases 10 and 22, to ordinarily prevent the detachment of the tubing 20 from either of the cases.

In practice, the case 22 is carried by one of steering knuckles 39, as usual, by means of a suitable bracket 40, whereby the actuating gear 8 will be held in coöperative relation with the respective steering wheel to be actuated by the tappet (not shown) carried by the said wheel.

A flexible section 41 is preferably interposed in the tubing or pipe 20, to permit the said tubing or pipe to flex intermediate its ends, due to the movement of the vehicle body with respect to the steering knuckle 39 carrying the case 22. A coupling sleeve 42 is also preferably interposed in the tubing or pipe 20 for enabling the tubing or pipe to be opened or separated intermediate its ends, for convenience in applying and detaching the tubing, or for opening the tubing for other purposes.

From the foregoing, the several advantages, of the present appliance will be obvious, without lengthy comment. It is to be noted that with the present device, the chauffeur or other person cannot tamper with the actuating mechanism for the meter, without detection. In this manner, the chauffeur or other person is prevented from disconnecting the meter from the actuating mechanism, which is not infrequently done by maliciously inclined chauffeurs, to defraud the owner or employer.

The present device eliminates the employment of seals for protecting the meter and its actuating mechanism, it being well known that in many cases, these seals, are broken open and replaced without detection.

The cases 10 and 22 may be readily opened, through the medium of proper keys, when it is desired to make repairs or to replace the flexible shaft 5. The present device also serves as an ornamental finish for the meter actuating mechanism, by inclosing or housing the same.

Having thus described the invention, what is claimed as new is:—

1. In a device of the character described, a pair of cases adapted to house the couplings between a flexible shaft and a meter shaft and actuating member, respectively, each case including a removable cover through which the flexible shaft is adapted to pass, means for locking the covers in place, and a tubing through which the flexible shaft is adapted to pass, and having its ends anchored to the said covers.

2. In a device of the character described, a case adapted to house a coupling between a flexible shaft and another member disposed within the case, a removable cover for the case having means for the passage of the flexible shaft, means for locking the cover to the case, and a tubing through which the flexible shaft is adapted to pass, and having one end anchored to the said means.

3. In a device of the character described, a case adapted to house a coupling between a flexible shaft and another member disposed within the case, a cover for the case having means for the passage of the flexible shaft, one end of the cover and one end of the case having interengageable means for permitting the cover to be swung open and closed, and key-controlled means for locking the other end of the cover and case together, and a tubing through which the flexible shaft is adapted to pass, and having one end anchored within the said means through which the flexible shaft is adapted to pass.

4. In a device of the character described, a case adapted to house the coupling between a flexible shaft and another member disposed within the case, a removable cover for the case, means for locking the cover to the case, the cover having an outstanding tubular portion through which the flexible shaft is adapted to pass, the free end of the tubular portion having an inturned flange, and a tubing through which the flexible shaft is adapted to pass and having an outturned flange at one end disposed within the said tubular portion and engageable with the aforesaid flange.

In testimony that we claim the foregoing as our own, we have hereto affixed our signatures in the presence of two witnesses.

WALTER LE ROY DIXON.
FRANCIS E. SHANLEY.

Witnesses:
Jno. L. O'Connor,
Jos. R. Borland.